United States Patent
Ohashi et al.

(10) Patent No.: US 8,209,086 B2
(45) Date of Patent: Jun. 26, 2012

(54) VEHICLE HEIGHT ADJUSTMENT DEVICE

(75) Inventors: Hideki Ohashi, Chiryu (JP); Kotaro Okimura, Toyota (JP); Shuji Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 786 days.

(21) Appl. No.: 12/185,414

(22) Filed: Aug. 4, 2008

(65) Prior Publication Data

US 2009/0062985 A1 Mar. 5, 2009

(30) Foreign Application Priority Data

Aug. 28, 2007 (JP) .................................. 2007-221496

(51) Int. Cl.
*B60G 17/08* (2006.01)
(52) U.S. Cl. ..................... 701/37; 280/5.505; 280/5.514; 280/6.151
(58) Field of Classification Search .................... 701/37; 280/5.505, 5.514, 6.151
See application file for complete search history.

(56) References Cited

U.S. PATENT DOCUMENTS

| | | | | |
|---|---|---|---|---|
| 6,898,501 B2 * | 5/2005 | Schubert | ........................ | 701/50 |
| 7,316,406 B2 * | 1/2008 | Kimura et al. | ............. | 280/6.157 |
| 7,434,816 B2 * | 10/2008 | Knox et al. | ................ | 280/5.518 |

FOREIGN PATENT DOCUMENTS

| | | |
|---|---|---|
| JP | 60-131308 | 7/1985 |
| JP | 62-59111 | 3/1987 |
| JP | 63-166612 | 7/1988 |
| JP | 5-96921 | 4/1993 |
| JP | 10-278532 | 10/1998 |
| JP | 11-198625 | 7/1999 |
| JP | 2004-352056 | 12/2004 |
| JP | 2005-271718 | 10/2005 |
| JP | 2007-15657 | 1/2007 |

* cited by examiner

*Primary Examiner* — Eric Culbreth
(74) *Attorney, Agent, or Firm* — Oblon, Spivak, McClelland, Maier & Neustadt, L.L.P.

(57) ABSTRACT

A vehicle height adjustment device includes a vehicle height adjustment unit that changes the vehicle height at each wheel of the vehicle; a vehicle height sensor that detects the vehicle height at each wheel; a vehicle height control unit that executes the vehicle height control; a pressure sensor that detects the fluid pressure within the vehicle height adjustment unit; a control stop unit that temporarily suspends the execution of the vehicle height control if the detected pressure exceeds a threshold pressure; a road surface estimation unit that estimates the condition of a road surface over which the vehicle travels; and a control recovery unit that cancels the temporary suspension of the vehicle height control and allows the vehicle height adjustment unit to change the vehicle height if the road surface estimation unit estimates that the road surface over which the vehicle is traveling satisfies a predetermined condition.

14 Claims, 4 Drawing Sheets

VEHICLE HEIGHT ADJUSTMENT DEVICE

INCORPORATION BY REFERENCE

The disclosure of Japanese Patent Application No. 2007-221496 filed on Aug. 28, 2007 including the specification, drawings and abstract is incorporated herein by reference in its entirety.

BACKGROUND OF THE INVENTION

1. Field of the Invention

The invention relates to a vehicle height adjustment device, and more particularly, to an improvement in the control of recovering the operation of the vehicle height adjustment device.

2. Description of the Related Art

Conventionally, a vehicle height adjustment device changes the vehicle the vehicle height by controlling the supply and discharge of the fluid in accordance with the condition of vehicle being used and the running state of the vehicle. For example, the vehicle height may be reduced to facilitate the entry and exit of a passenger from the vehicle. The vehicle height may also be adjusted such that the height of a platform coincides with the height of a luggage carrier to facilitate the loading and unloading of a piece of luggage from the vehicle.

A vehicle height adjustment device described in Japanese Patent Application Publication No. 11-198625 (JP-A-11-198625) automatically adjusts the vehicle height to a target vehicle height. In particular, a suspension control means is disclosed that suspends the supply of a fluid for a predetermined time to protect a fluid system, which includes fluid pumps, hydraulic cylinders, and the like, when the target vehicle height cannot be achieved due to excessive load or when the fluid system is overloaded although the target vehicle height is achieved.

The vehicle height at a particular wheel may decrease if the vehicle runs on a rock while running on a bad road or runs on a curbstone even while running normally. In this case, the internal pressure of the hydraulic cylinder that controls the vehicle height at the particular wheel rises and may exceed the aforementioned protection pressure even though the actual vehicle height is not raised, whereby the execution of the vehicle height control may be temporarily suspended. Once the failsafe of the suspension, takes place, the failsafe cannot be canceled simply. In general, the failsafe cannot be canceled without going through a predetermined cancellation step.

Once the particular wheel leaves bad road running section or gets off the curbstone, the vehicle height should be increased. However, due to the aforementioned failsafe, the internal pressure of the hydraulic cylinder is high, so that the control of temporarily suspension remains. Therefore, the vehicle height cannot be swiftly raised in an attempt to reach an appropriate vehicle height. As a result, the vehicle is inclined and causes a sense of incongruity to passengers therein.

SUMMARY OF THE INVENTION

The invention provides a vehicle height adjustment device allowing a vehicle to run at an appropriate vehicle height by swiftly canceling the temporary suspension of a vehicle height control when the vehicle has moved to a position enabling normal movement of the vehicle even if the temporary suspension of the vehicle height control is executed due to an increase in a pressure of a vehicle height adjustment unit.

An aspect of the invention relates to a vehicle height adjustment device. The vehicle height adjustment device includes: a vehicle height adjustment unit, disposed between an axle for supporting respective wheels of a vehicle and a vehicle body, that changes a vehicle height at each wheel of the vehicle through controlling supply and discharge of a fluid; a vehicle height sensor that detects the vehicle height at each wheel; a vehicle height control unit that executes a vehicle height control, which includes a standard vehicle height control for making the vehicle height at each wheel equal to a predetermined standard vehicle height by controlling the vehicle height adjustment unit; a pressure sensor that detects a fluid pressure within the vehicle height adjustment unit; a control stop unit that temporarily suspends the execution of the vehicle height control by the vehicle height control unit if the detected fluid pressure exceeds a threshold pressure; a road surface estimation unit that estimates a condition of a road surface over which the vehicle travels; and a control recovery unit that cancels the temporary suspension of the vehicle height control by the control stop unit and allows the vehicle height adjustment unit to change the vehicle height, while the control stop unit temporarily suspends the vehicle height control unit from performing the control, if the road surface estimation unit estimates that the road surface over which the vehicle is traveling satisfies a predetermined condition.

According to this aspect of the invention, even when the vehicle enters a bad road and vehicle height control is temporarily suspended to protect the vehicle height adjustment unit, the temporary suspension of vehicle height control by the control stop unit can be swiftly canceled when the vehicle is estimated to have left the bad road. As a result, the adjustment of vehicle height can be smoothly resumed after the vehicle leaves the bad road. Thus, vehicle height control can be performed without causing a sense of incongruity to passengers in the vehicle.

According to the vehicle height adjustment device of the invention, even in the case where a temporarily suspension of the vehicle height control is performed due to a rise in the pressure of the vehicle height adjustment unit, the vehicle can be caused to run at an appropriate vehicle height by swiftly canceling the temporarily suspension of the vehicle height control when the vehicle has moved to a position enabling normal running thereof.

BRIEF DESCRIPTION OF THE DRAWINGS

The foregoing and further features and advantages of the invention will become apparent from the following description of an example embodiment with reference to the accompanying drawings, wherein like numerals are used to represent like elements and wherein.

DETAILED DESCRIPTION OF EMBODIMENT

A vehicle height adjustment device according to an embodiment of the invention includes: a control stop means that preliminarily temporary suspends an overload from being applied to a vehicle height adjustment means, that is composed of a hydraulic cylinder and the like, in the case the overload is applied to the vehicle height adjustment means due to the concentration of a vehicle weight load on one or some of wheels, that is caused by the inclination of a vehicle running on a bad road; and control recovery means that cancels the temporary suspension of the execution of the vehicle height control by the vehicle height adjustment means. The vehicle height adjustment device also includes a road surface estimation means that estimates the condition of a road surface over which the vehicle travels.

When the control stop means temporarily suspends execution of the vehicle height control by the vehicle height adjustment means, the road surface estimation means estimates the condition of the road surface over which the vehicle travels. If, as a result of the estimation of the road surface condition, it is determined that the vehicle is no longer traveling over a bad road which leads to overload the vehicle height adjustment means, which is a state that the road surface over which the vehicle is traveling satisfies a predetermined condition allowing the vehicle to run normally, the control recovery means cancels the control stop means temporary suspending the vehicle height control by the vehicle height adjustment means. As a result, the adjustment of vehicle height can be smoothly resumed once the vehicle is no longer traveling over a bad road, and vehicle height control is realized without causing a sense of incongruity to passengers in the vehicle.

Figure 1:
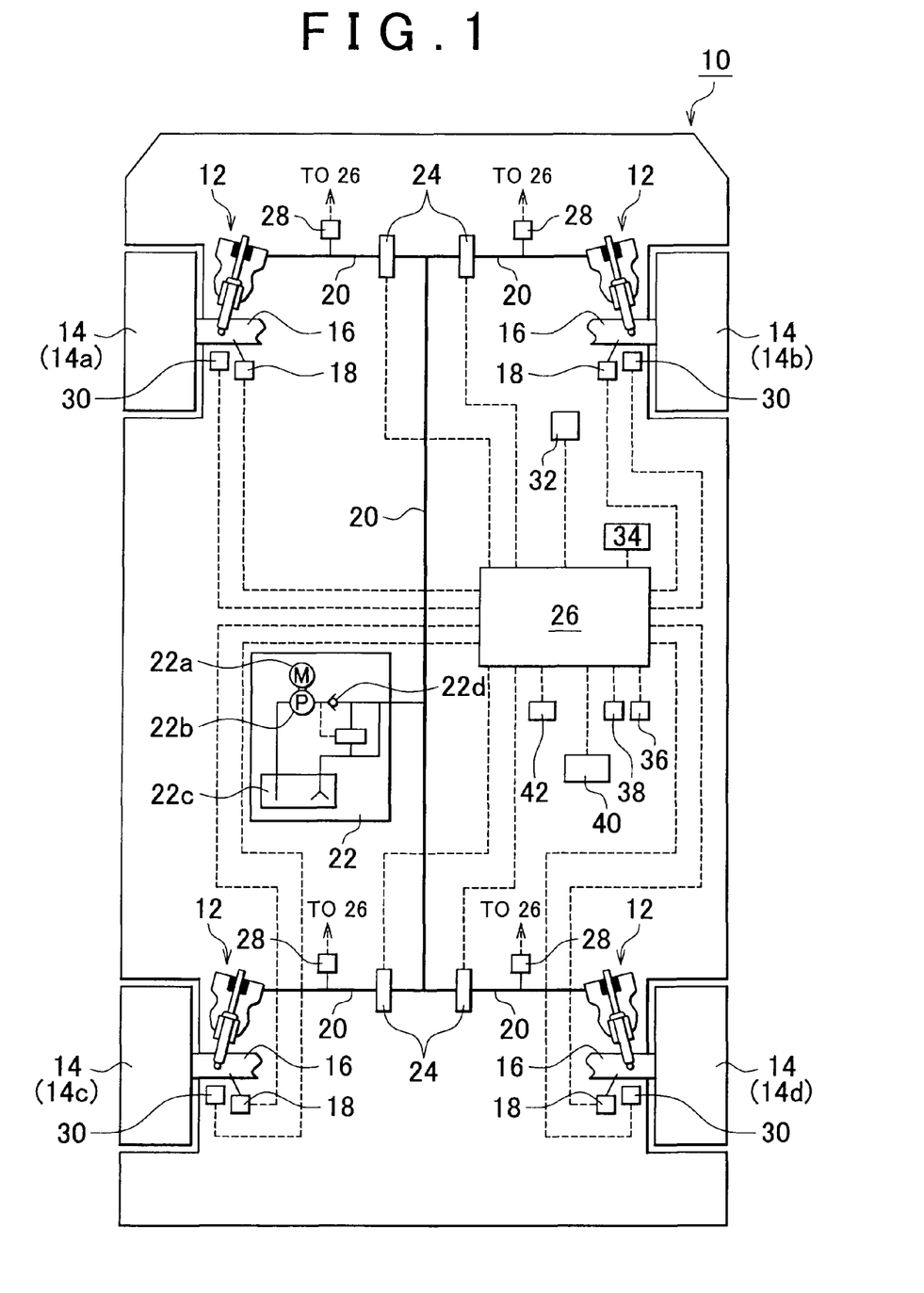
FIG. 1 is a configurational diagram of a vehicle mounted with a vehicle height adjustment device according to this embodiment of the invention.

FIG. 1 is a configurational diagram of a vehicle 10 equipped with a vehicle height adjustment device according to this embodiment of the invention. FIG. 1 only shows the configuration of the vehicle height adjustment device with other configurational details omitted. In this embodiment of the invention, each of absorber unit 12 endowed with a function of vehicle height adjustment and included in, for example, an electronically controlled hydraulic suspension can be employed as vehicle height adjustment means for changing a vehicle height at a position of a particular wheel.

Conventional components may be used as the absorber unit 12, which function as the vehicle height adjustment means. For example, the degree of expansion of the absorber unit 12 may be adjusted by regulating the flow of a working fluid into and out of a chamber formed inside the absorber unit 12 to change the vehicle height. The absorber unit 12 is part of a suspension that supports a wheel 14 on either side of the vehicle. The absorber unit 12 is connected at a lower end thereof to a suspension arm 16 (the wheel 14 side) ["The lower end of the absorber unit 12, which is near the wheel 14, is connected to a suspension arm 16"?]. The upper end of the absorber unit 12 is connected to the vehicle body (not shown).

Accordingly, even when vibrations or an impact is imparted to the vehicle from the road surface on which it is traveling, the absorber unit 12 exerts a vibration damping effect that absorbs the vibrations or the impact and hence contributes toward improving the ride comfort and an increase in running stability. By causing the working fluid to flow into and from the chamber of the absorber unit 12, the expansion and contraction of the absorber unit 12 may be adjusted. Thus, the vertical distance between the vehicle body and each wheel 14 is adjusted to change the vehicle height.

The expansion and the contraction of the absorber unit 12 may be controlled based on, for example, a vehicle height value detected by a vehicle height sensor 18, which may be provided at each suspension arm 16 (a lower arm or the like), which functions as a vehicle height detection means. For example, when the load of the vehicle 10 or the number of passengers in the vehicle 10 changes, the vehicle height changes in accordance with the weight thereof. If the absorber units 12 are controlled when the weight of the vehicle changes, the vehicle height may be controlled to a substantially constant height. As a result, the attitude of the vehicle level is stabilized. Also the resonance frequency of each part of the vehicle on a spring can be held substantially constant, whereby good ride comfort and stable maneuverability can be achieved.

The vehicle height may also be changed in accordance with the speed of the vehicle so that the vehicle travels at an appropriate vehicle height for its speed. By reducing the vehicle height when a passenger gets on/off the vehicle, it eases the passenger to get on/off the vehicle. If the height of a trunk basement is adjusted to load/unload luggage, the loading/unloading the luggage may be facilitated. Furthermore, if, for example, one of the wheels 14 travels over an obstacle (e.g., a rock, a curbstone, or the like) on a road surface or becomes stuck in a pothole, the vehicle height at each wheel 14 is changed. The vehicle 10 is thereby prevented from becoming unable to move as a result of excessive inclination or contact of the vehicle floor with the road surface.

A fluid supply/discharge unit 22 is connected to each absorber unit 12 via an oil passage 20. The fluid supply/discharge unit 22 is equipped with a hydraulic pump 22b driven by an electric motor 22a. The hydraulic pump 22b draws working fluid from a reservoir tank 22c, and supplies the working fluid to the oil passage 20 via a check valve 22d. The working fluid supplied to the oil passage 20 is distributed to each absorber unit 12 via a corresponding control valve 24 provided for each 14. By supplying the working fluid to an absorber unit 12, the internal pressure in the absorber unit 12 is increased, and thereby causes the absorber unit 12 to extend. That is, a vehicle height control to increase the vehicle height is executed.

Alternatively, when working fluid is discharged from an absorber unit 12, the working fluid is returned to the reservoir tank 22c of the fluid supply/discharge unit 22 via the corresponding control valves 24. The internal pressure of the absorber unit 12 is thereby reduced, which causes the absorber unit 12 to contract. Thus, a vehicle height control to increase the vehicle height is executed.

The control valve 24 is controlled to be opened/closed by the ECU 26, which functions as control means for controlling the entire vehicle height adjustment device.

The ECU 26 controls the operation of the fluid supply/discharge unit 22. The ECU 26 controls each control valve 24 through a feedback control based on the vehicle height detected by the corresponding vehicle height sensor 18 provided at each wheel 14. Accordingly, by detecting the height of the suspension arm 16 with respect to the vehicle body through the use of the vehicle height sensor 18, appropriate vehicle height control may be executed by appropriately controlling the expansion and contraction of the absorber unit 12. For example, if one of the wheels 14 travels over an obstacle such as a rock, a curbstone, or the like, the flow of the working fluid is controlled to reduce the vehicle height such that the wheel 14 approaches the vehicle 10. In contrast, if one of the wheels 14 gets stuck in a pothole whereby the wheel 14 is caused to move away from the vehicle 10, the flow of the working fluid is controlled to increase the vehicle height.

The ECU 26 is provided with the parameters required for controlling the adjustment of vehicle height.

A pressure sensor 28 is provided between each absorber unit 12 and its corresponding control valve 24. The pressure sensor 28 functions as pressure detection means for detecting the value of a pressure inside the absorber unit 12. Each pressure sensor 28 constantly provides the ECU 26 with the pressure detected in the corresponding absorber unit 12.

Each vehicle height sensor 18 provides the ECU 26 with the vehicle height detected at its corresponding wheel 14. A wheel speed sensor 30 is provided near each wheel 14 to measure the wheel speed of each wheel 14. The wheel speed sensors 30 constantly provide the ECU 26 with the detected wheel speed.

The ECU 26 determines the vehicle speed of the vehicle 10 based on the detected wheel speed. Alternatively, the ECU 26 may acquire the wheel speed and vehicle speed from a system other than the vehicle height control device for the use of the vehicle height control.

A vehicle height adjustment switch 32, which may be operated by a driver to manually execute the adjustment of vehicle height, is connected to the ECU 26. The vehicle height adjustment switch 32 is basically operable only when the vehicle 10 is stopped. It is also appropriate to allow the ECU 26 to receive a manipulation signal from the vehicle height adjustment switch 32 only when the vehicle 10 is stopped.

A display unit 34, which displays the state of vehicle height adjustment and the temporary suspension of vehicle height adjustment control or the cancellation of the temporary suspension to the driver, may be connected to the ECU 26. The display unit 34 may be equipped with an indicator or a speaker.

In addition, the ECU 26 of the vehicle height adjustment device according to this embodiment of the invention is provided with various parameters used to estimate the condition of a road surface.

For example, an acceleration sensor 36 may provide the ECU 26 with parameter on the longitudinal acceleration of the vehicle 10 or the lateral acceleration of the vehicle 10. A yaw sensor 38 provides the ECU 26 with information on the degree of yaw of the vehicle 10. A navigation system 40 provides the ECU 26 with information regarding the position of the vehicle 10, the condition of roads, and the like. A liquid level sensor 42 provides the ECU 26 with information on the liquid level inclination state of a liquid with which the vehicle 10 is loaded.

As will be described later, the condition of the road surface over which the vehicle is traveling may also be estimated based on information obtained from only the vehicle height sensors 18 or the information from the wheel speed sensors 30. Accordingly, it is not indispensable to provide the ECU 26 with an acceleration sensor 36, a yaw sensor 38, or a navigation system 40. The types and nature of the parameters to be used may be appropriately selected. However, by estimating the condition of the road surface based on several different types of parameters, the reliability of the estimate may be enhanced.

Figure 2:
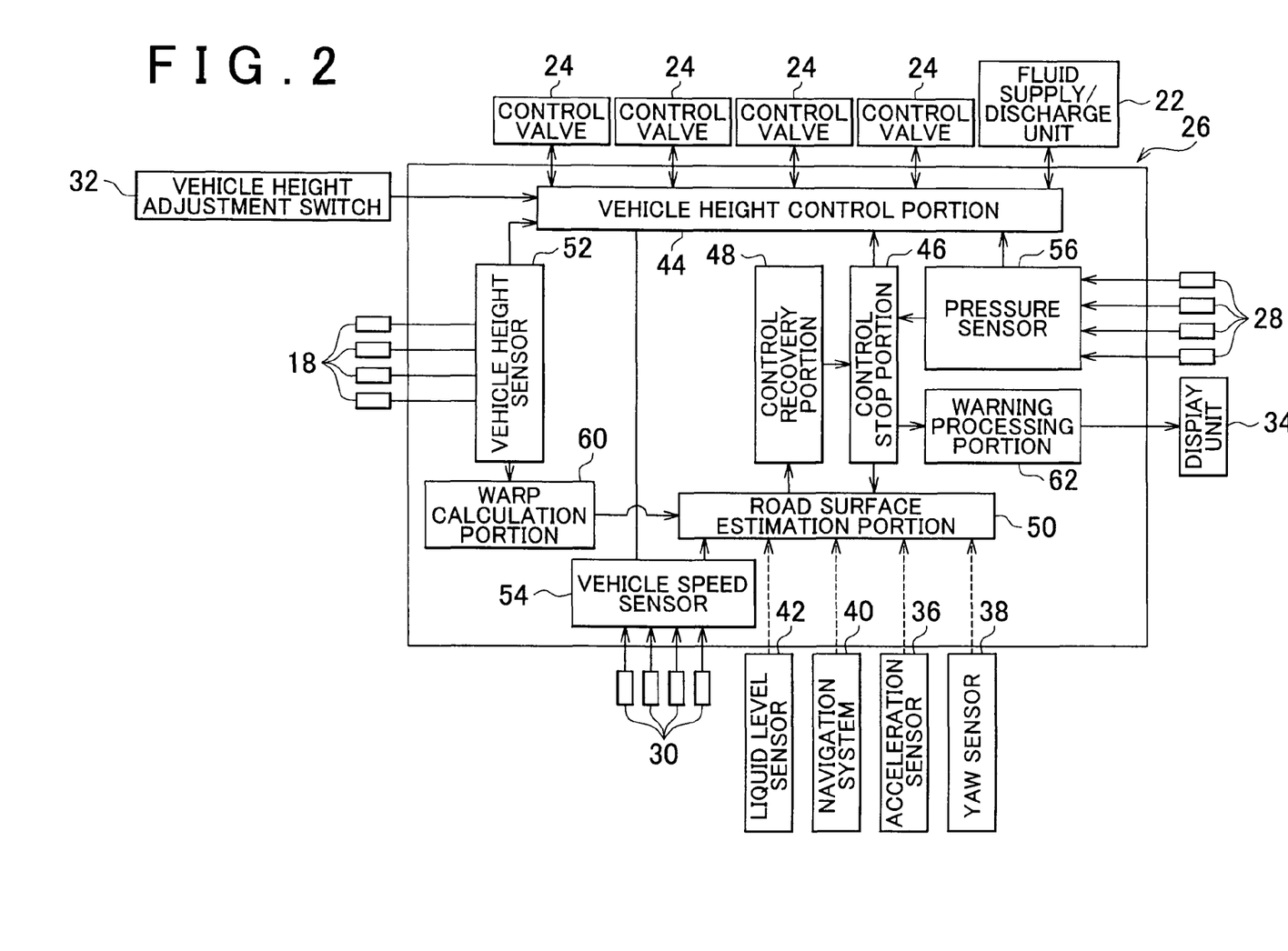
FIG. 2 is a block diagram for explaining the internal configuration of an ECU of the vehicle height adjustment device according to this embodiment of the invention.

FIG. 2 is a block diagram that explains the configuration of the ECU 26. In this embodiment of the invention, the ECU 26 includes a vehicle height control portion 44, a control stop portion 46, a control recovery portion 48, and a road surface estimation portion 50.

The vehicle height control portion 44 normally operates after receiving a signal that indicates the driver has operated the vehicle height adjustment switch 32. If a reduction in vehicle height is preferred to allow passengers to get on/off the vehicle 10 or when the roof of the vehicle may contact the ceiling of a gate, a tunnel, or a garage when the vehicle 10 is at a standard vehicle height, a downward manipulation of the vehicle height adjustment switch 32 instructs the vehicle height control portion 44 to reduce the vehicle height from the standard vehicle height. If an increase in the height of the trunk basement in accordance with the height to which a luggage or the like is carried ease the loading/unloading of the luggage or if an increase in the vehicle height makes it easy for the vehicle to travel over the irregular surface of a rough road or the like, an upward manipulation of the vehicle height adjustment switch 32 instructs the vehicle height control portion 44 to increase the vehicle height from a reference vehicle height.

The standard vehicle height may be determined at the stage of designing the vehicle. The standard vehicle height takes into account the air resistance when the vehicle is in motion and the position of the center of gravity of the vehicle, and is suited for the vehicle to run stably and smoothly. For example, stable running may be achieved by having the vehicle 10 travel at the standard vehicle height when the speed of the vehicle is equal to or above a predetermined speed (e.g., equal to or above 30 km/h).

The vehicle height control portion 44 controls the control valves 24 in order to execute the control to achieve an appropriate vehicle height suited for the situation of use of the vehicle 10 or to achieve the standard vehicle height. For this purpose, the vehicle height control portion 44 acquires the vehicle height detected by each vehicle height sensor 18 via a vehicle height sensor 52, a speed of the vehicle 10 via a vehicle speed sensor 54, pressure values detected by the respective pressure sensors 28 via a pressure sensor 56, and the like. The vehicle height control portion 44 then executes an actuation control of the respective control valves 24, namely, operation control of the respective absorber units 12 in the form of, for example, feedback control. The vehicle height control portion 44 executes a supply and discharge operation control of the fluid supply/discharge unit 22 as well.

The control stop portion 46 determines, based on the pressure values detected at each wheel, whether to temporarily suspend the execution of the vehicle height control by the vehicle height control portion 44, and thus prevents each of the absorber units 12 from being overloaded with excessive pressure. A signal that indicates the temporary suspension of the vehicle height control, is presented to the vehicle height control portion 44, thereby temporarily suspending the control of that one of the control valves 24 which correspond to a relevant one of the absorber units 12.

Figure 3:
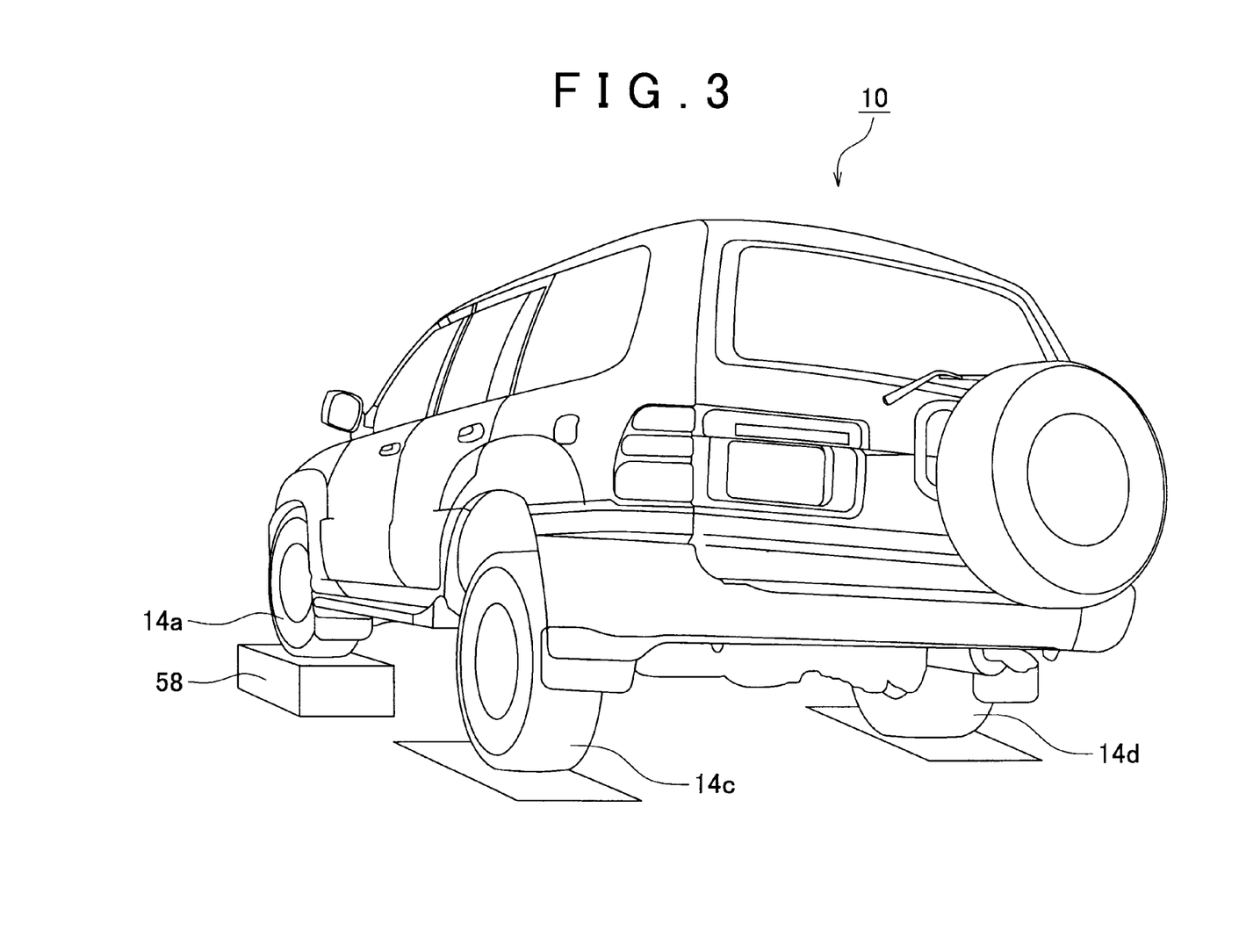
FIG. 3 is a diagram for explaining a attitude of the vehicle when a control stop portion in the vehicle height adjustment device according to this embodiment of the invention temporarily suspends the vehicle height control portion from executing the vehicle height control.

FIG. 3 is a diagram for explaining the attitude of the vehicle 10 when the control stop portion 46 temporarily suspends execution of the vehicle height control by the vehicle height control portion 44. Exemplified in FIG. 3 is an off-road vehicle as an example of a vehicle equipped with a vehicle height adjustment device. FIG. 3 shows a state in which the vehicle 10 has traveled over an obstacle 58 such as a rock, a curbstone, or the like.

As described above, the vehicle height adjustment device may be used to facilitate the entry and exit of passengers from the vehicle easily and as well as the loading/unloading of luggage. When the vehicle height adjustment device is used in this manner, the adjustment of vehicle height at each wheel is adjusted by substantially the same amount. Thus, the vehicle body of the vehicle 10 remains level with respect to the road surface as the vehicle height is adjusted. The vehicle height adjustment device may also be used to prevent the vehicle from becoming unable to move due to drastic inclination of the vehicle resulting from irregularities on a road surface or contact of the floor of the vehicle with the road surface. In this case, the vehicle height at each wheel is independently adjusted in accordance with the condition of the road surface.

As shown in FIG. 3, in the case if the obstacle 58 is present on the road surface and the front-left wheel 14a runs over the obstacle 58, the vehicle 10 is inclined. Thus, the weight of the vehicle is concentrated on the front-left wheel 14a and the rear-right wheel 14d, and the absorber units 12 supporting these wheels 14 are compressed. On the other hand, the front-right wheel 14b (see FIG. 1) and the rear-left wheel 14c are off the road, and are hanging from the vehicle 10 via the corresponding absorber units 12 (i.e. these absorber units 12 are expanded). In such a case, the weight of the vehicle is concentrated on the front-left wheel 14a and the rear-right wheel 14d, and the vehicle heights at these wheels 14 decrease. In particular, the vehicle height at the front-left wheel 14a, which is located on a heavy front-wheel side mounted with an engine, decreases extremely. At this moment, the internal pressure of the absorber unit 12 at the position of the front-left wheel 14a rises.

Then, when the pressure value of one of the pressure sensors 28 detected via the pressure sensor 56 exceeds a predetermined threshold, the control stop portion 46 temporarily stops the control of raising the hydraulic pressure of the working fluid so that the internal pressure of the corresponding one of the absorber units 12 does not rise any further. In the case of FIG. 3, the control stop portion 46 temporarily stops the control of raising the hydraulic pressure of the front-left wheel 14a (vehicle height raising control).

Because the engine is mounted on the front-wheel side, the weight of the vehicle is likely to fall on the front-left wheel 14a when the vehicle 10 is inclined. Thus, the control stop portion 46 is actuated more frequently for the front-left wheel 14a than for the rear-right wheel 14d. However, the load of vehicle weight is also applied to the rear-right wheel 14d due to the inclination of the vehicle 10 or the weight balance of the vehicle 10. Thus, there may be a situation that the control stop portion 46 may operate for the rear-right wheel 14d.

In the related art, the control stop portion 46 temporarily suspends the vehicle height control based on a failsafe processing for preventing the absorber units 12 from being overloaded. Therefore, the temporary suspension of the vehicle height control is not canceled without going through a predetermined manipulation step. Thus, even after the front-left wheel 14a has descended from the salient object 58, the temporary suspension of the vehicle height control is maintained. As a result, the internal pressure of the absorber unit 12 for the front-left wheel 14a is left high despite the vehicle height remaining low. Therefore, the vehicle height cannot be raised to return to the standard vehicle height, and a sense of incongruity is caused to passengers in the vehicle 10.

Thus, in this embodiment of the invention, the road surface estimation portion 50 estimates the condition of the road surface over which the vehicle travels using parameters from various sensors. If it is determined that the road surface over which the vehicle 10 is traveling satisfies a predetermined road surface condition, it may be determined that the cause for an excessive increase in the internal pressure of one of the absorber units 12 is eliminated. Then, the control recovery portion 48 cancels the temporary suspension of the vehicle height control.

The road surface estimation portion 50 starts estimating the condition of the road surface over which the vehicle 10 travels after it receives a signal from the control stop portion 46 that indicates the vehicle height control is temporarily suspended.

The condition of the road surface over which the vehicle 10 travels may be estimated using a plurality of methods.

The respective methods will be described hereinafter. The condition of the road surface may be estimated even using one of those methods alone. However, by estimating the road surface condition using a combination of some or all of those methods, the reliability of the estimation is further enhanced. Thus, vehicle height control may be smoothly recovered.

If the vehicle 10 is moving, the condition of the road surface may be estimated based on the speed of the vehicle 10. The road surface estimation portion 50 acquires information on a running state (vehicle speed) of the vehicle 10 from the vehicle speed sensor 54. The vehicle speed sensor 54 may calculate the vehicle speed based on the wheel speed detected by the wheel speed sensors 30, or acquire wheel speeds and a vehicle speed, which are detected by another system such as an ABS system or the like, and use the acquired values for vehicle height control.

If one of the wheels 14 runs over an obstacle 58 or if the vehicle 10 is traveling on a bumpy road, the driver usually determines that it may be difficult for the vehicle 10 to travel, and may cause the driver to reduce the speed of the vehicle 10. In contrast, after the wheel 14 has passed the obstacle 58 or if the vehicle 10 leaves the bumpy road, the driver determines that it may be easy for the vehicle 10 to travel, and may cause the driver to increase the speed of the vehicle 10 to some extent. That is, the condition of the road surface over which the vehicle 10 travels may be estimated based on the speed of the vehicle 10.

When the control recovery portion 48 determines that the road surface condition satisfies a vehicle-height-control suspension-cancellation condition for canceling the temporary suspension of the vehicle height control, the control recovery portion 48 sends a signal to the control stop portion 46 to cancel the temporary suspension of vehicle height control. When the vehicle speed is above a predetermined threshold speed, the control recovery portion 48 determines that the road surface over which the vehicle 10 is traveling satisfies the predetermined road surface condition.

The predetermined threshold speed that satisfies the vehicle-height-control suspension-cancellation condition may be set to, for example, 30 km/h. When the vehicle speed exceeds 30 km/h, the temporary suspension of vehicle height control is cancelled. If the speed of the vehicle 10 is equal to or below 30 km/h, it is estimated that the wheel 14 has not descended from the obstacle 58 or that the vehicle 10 has not left the bumpy road, and thus, the temporary suspension of vehicle height control is maintained.

The control stop portion 46 cancels the temporary suspension of vehicle height control when it receives a signal to cancel the temporary suspension of the vehicle height control. As a result, the vehicle height control portion 44 enables the control of the particular control valve 24 for which the vehicle height control has been temporarily suspended. That is, the vehicle height control portion 44 starts supplying the working fluid to the front-left wheel 14a, after the wheel 14a has traversed the obstacle 58 keeping the vehicle height low, to increase the vehicle height (i.e., returning the vehicle height to the standard vehicle height). As a result, the vehicle height at the front-left wheel 14a may be immediately returned to the standard vehicle height, and the vehicle height control may be swiftly executed without causing a sense of incongruity to passengers in the vehicle 10.

Alternatively, the road surface estimation portion 50 may estimate the condition of the road surface by using the vehicle height values. The road surface estimation portion 50 issues to a warp calculation portion 60 a calculation request to calculate a warp value used to estimate the condition of the road surface when it receives a signal from the control stop portion 46 to temporarily suspend vehicle height control.

When the warp calculation portion 60 receives the calculation request, it calculates a warp value that indicates the condition of the road surface over which the vehicle is traveling based on a comparison of the detected vehicle height at each wheel 14. The warp calculation portion 60 calculates the sum of vehicle height values detected at each diagonally opposite pair of wheels 14 of the vehicle 10. The warp calculation portion 60 calculates the difference between this sum of the vehicle height values and a subsequently obtained sum of vehicle height values corresponding to the other two wheels 14 arranged on the other diagonal line of the vehicle 10, and the difference obtained between the two sums is the warp. It is possible to estimate whether the vehicle 10 is traveling over a flat road surface or a bumpy road surface based on the magnitude of the warp value.

Even when the vehicle height control is temporarily suspended, if the wheel 14 has descended from the obstacle 58 or the vehicle 10 has left the bumpy road, the distribution of vehicle weight over each wheel 14 changes. Therefore, the vehicle height at each wheel 14 is changed. That is, the warp value calculated on the basis of the heights of the vehicle changes as well. The road surface estimation portion 50 estimates the condition of the road surface based on a change in the warp value.

More specifically, if the vehicle height value at the front-left wheel, the front-right wheel, the rear-left wheel is, and the rear-right wheel are is H[FL], H[FR], H[RL], and H[RR], respectively, a warp value Warp may be expressed by an expression: Warp=(H[FL]+H[RR])−(H[FR]+H[RL]).

When the warp value Warp is large, the road surface is estimated to be very uneven in the direction of one of the diagonal lines of the vehicle 10. That is, it is possible to estimate that the vehicle 10 attitude is twisted, and that the wheel 14 is still traversing the obstacle 58 or that the vehicle 10 has not left the bumpy road. In contrast, if the warp value Warp is small (ideally "0"), it is possible to estimate that the wheel 14 has traversed the obstacle 58 or that the vehicle 10 has left the bumpy road.

The road surface estimation portion 50 calculates the absolute value of the difference between a warp value Warp acquired when the vehicle height control temporarily suspended and a warp value Warp acquired after the temporary suspension of the vehicle height control has been suspended. If the absolute value of the difference is equal to or exceeds a predetermined threshold warp value (e.g., the threshold warp value Warp may be equal to 100 mm when the vehicle height control is suspended and the calculated warp value Warp is 150 mm), the road surface estimation portion 50 then estimates that the wheel 14 has traversed the obstacle 58 or that the vehicle 10 has left the bumpy road. According to the estimation, the control recovery portion 48 determines that the road surface over which the vehicle 10 is traveling satisfies the predetermined condition, and transmits a signal to the control stop portion 46 to cancel the temporary suspension of the vehicle height control.

A warning processing portion 62 is connected to the control stop portion 46. When the control stop portion 46 temporarily suspends execution of the vehicle height control or when the temporary suspension of the vehicle height control is canceled, the warning processing portion 62 displays on the display unit 34 a message that indicates the temporary suspension of the vehicle height control or the cancellation of the vehicle height control, thereby alerting the driver. Information regarding the vehicle height at each wheel 14, the pressure at each wheel 14, and the like may be displayed on the display unit 34.

When signs of the warp value Warp acquired during the temporary suspension of the vehicle height control and the warp value Warp acquired after the suspension is canceled, each of which is either "+" or "−", are interchanged, namely, when a great change occurs in the twisting of the vehicle 10, the road surface estimation portion 50 may estimate that the wheel 14 has traversed the obstacle 58 or that the vehicle 10 has left the bumpy road. The control recovery portion 48 determines, based on the estimation, that the road surface over which the vehicle 10 is traveling satisfies the predetermined condition, and sends a signal to the control stop portion 46 to cancel the temporary suspension of the vehicle height control.

The road surface estimation portion 50 may also estimate the condition of the road surface based on the vehicle acceleration detected by the acceleration sensor 36 or the vehicle yaw detected by the yaw sensor 38. Either of the lateral acceleration or the longitudinal acceleration may be used to estimate the condition of the road surface.

If the vehicle 10 is running in an inclined attitude position with one of the wheels 14 running over an obstacle 58 or if the vehicle is traveling on a bumpy road, the longitudinal acceleration of the vehicle, the lateral acceleration of the vehicle, and the vehicle yaw increase. In contrast, if the vehicle 10 shifts from that state and starts traveling on a level road after the wheel 14 has traversed the obstacle 58 or after the vehicle has left the bumpy road, the attitude vehicle 10 returns to attitude level, and the longitudinal acceleration of the vehicle, the lateral acceleration of the vehicle, and the yaw of the vehicle decrease. Accordingly, based on a comparison between the reference horizontal attitude when the vehicle 10 travels over a substantially horizontal road surface and the current attitude of the vehicle 10, it is possible to estimate whether the road surface over which the vehicle 10 is traveling satisfies the predetermined condition.

More specifically, if either the longitudinal acceleration or lateral acceleration>a critical value a, the control stop portion 46 temporarily suspends the vehicle height control. After that, if either of the longitudinal acceleration or lateral acceleration<a critical value b (where a>b), it is estimated that the wheel 14 has traversed the obstacle 58 or that the vehicle 10 has left the bumpy road, resumed travel on a smooth road, and reassumed the reference horizontal attitude. On the basis of this estimation, the control recovery portion 48 sends a signal to the control stop portion 46 to cancel the temporary suspension of the vehicle height control.

When the information on yawing, which can be used in the similar way as the acceleration information, is used, if the amount of yaw>a critical value c, the control stop portion 46 temporarily suspends the vehicle height control. After that, if there is established a relationship: the amount of yaw<a critical value d (where c>d), it is possible to estimate that the wheel 14 has traversed the obstacle 58 or that the vehicle 10 has left the bumpy road, returned to a flat road, and reassumed the reference horizontal attitude. Based on this estimation, the control recovery portion 48 sends a signal to cancel the temporary suspension of vehicle height control to the control suspension portion 46.

In order to avoid chattering at the time of determination, it is desirable to set the critical values a and b different from the critical values c and d respectively. The critical values a, b, c, and d differ depending on the setting of the threshold pressure at which the control stop portion 46 temporarily suspends the vehicle height control and the displaceable amount of the absorber units 12. It is therefore desirable to conduct a test in advance and then empirically determine the critical values a, b, c, and d.

The road surface estimation portion 50 may estimate the condition of the road surface based on the position of the vehicle 10 and the road over which the vehicle is traveling, obtained from the navigation system 40. In general, the control stop portion 46 temporarily suspends the vehicle height control when the vehicle is present somewhere other than on a road indicated in a map, namely, on a rocky area, a riverbed, or the like. Accordingly, the road surface estimation portion 50 first acquires from the navigation system 40 the information on the position of the vehicle 10 and the information on the road over which the vehicle travels. If the control stop portion 46 temporarily suspends the vehicle height control somewhere other than on a road on the map, for example, at a distance of at least 20 m from the road and the vehicle 10 thereafter returns to a road on the map, for example, returns to a position within 10 m from the road, the road surface estimation portion 50 may estimate that the condition of the road surface is not a bumpy road. That is, it is possible to estimate that the road surface over which the vehicle 10 is traveling satisfies the predetermined condition. On the basis of this estimation, the control recovery portion 48 sends a signal to the control stop portion 46 to cancel the temporary suspension of the vehicle height control.

When the vehicle 10 has returned to a position within 10 m from the road, the condition of the road surface may be estimated based on the vehicle speed within the 10 m from the road. When the vehicle is traveling off-road, the driver may carefully drive the vehicle and become unable to greatly increase the speed of the vehicle because of the inclination of a road surface or the like. In some cases, therefore, the cancellation of the suspension of the vehicle height control may be delayed. On the other hand, if the navigation system 40 is used, an error in estimation resulting from a mental state of the driver may be eliminated. Therefore, the road surface estimation portion 50 can more reliably estimate the condition of the road surface.

The road surface estimation portion 50 may estimate the condition of the road surface based on a liquid level inclination of a liquid with which the vehicle 10 is loaded, which is presented from the liquid level sensor 42. When the vehicle 10 is inclined with one of the wheels 14 thereof having run on the obstacle 58 or after having entered a bumpy road, the level of the liquid is also inclined in accordance with the inclination of the vehicle 10. That is, the condition of the road surface over which the vehicle 10 is traveling may be estimated based on whether the inclination of the liquid level has returned to a substantially horizontal state. That is, it is possible to estimate that the road surface over which the vehicle 10 is traveling satisfies the predetermined condition. Accordingly, the temporary suspension of the vehicle height control may be canceled when the vehicle 10 is stopped from being inclined.

The liquid with which the vehicle 10 is loaded may be, for example, the working fluid supplied to the absorber units 12, a fluid stored in the reservoir tank such as brake fluid, fuel, or the like. In particular, the fluid stored in the reservoir tank is usually not replenished or consumed and hence increases/decreases only in accordance with changes in temperature.

More specifically, the road surface estimation portion 50 compares the absolute value L of the difference between the liquid level acquired by the liquid level sensor 42 and a reference liquid level (a liquid level on a flat road surface) with a level change value L0 resulting from the influence of temperature. Then, if the control stop portion 46 temporarily suspends the vehicle height control when L>L0, namely, when the level of the liquid is greatly inclined and where there is thereafter established a relationship: L<L0, namely, the level of the liquid thereafter becomes substantially horizontal, it is possible to estimate that the wheel 14 has traversed the obstacle 58 or that the vehicle 10 has left the bumpy road and returned to a level road. That is, it is possible to estimate that the road surface over which the vehicle 10 is traveling satisfies the predetermined condition. On the basis of this estimation, the control recovery portion 48 sends a signal to the control stop portion 46 to cancel the temporary suspension of vehicle height control. If a plurality of liquid level sensors is provided in the reservoir tank or the fuel tank, the inclination of the liquid level may be directly detected. Therefore, if the inclination of the liquid level becomes equal to or smaller than a predetermined threshold, it is appropriate to estimate that the wheel 14 has traversed the obstacle 58 or that the vehicle 10 has left the bumpy road and returned to the flat road.

Figure 4:
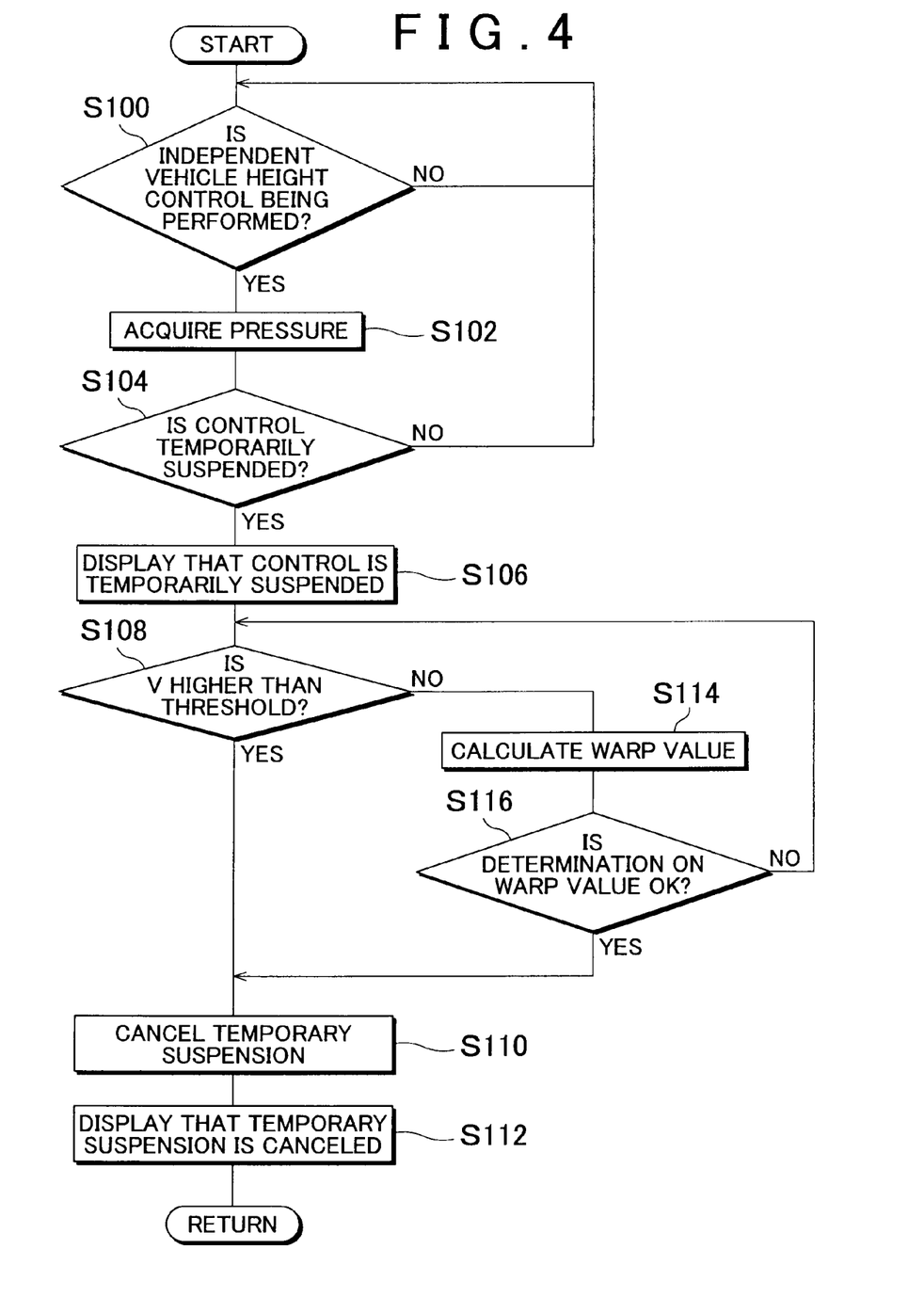
FIG. 4 is a flowchart for explaining the operation of the vehicle height adjustment device according to this embodiment of the invention.

In the vehicle height adjustment device configured as described above, the procedure of canceling the temporary suspension of the vehicle height control will be described based on the flowchart of FIG. 4. The use of the vehicle speed and the warp value in an estimation method of the road surface estimation portion 50 is depicted in the flowchart of FIG. 4. However, this method is not the only estimation method of the road surface estimation portion 50.

First, when the ignition switch of the vehicle 10 is turned on, the ECU 26 confirms a control state of the vehicle height control portion 44, and checks whether the wheels 14 are subjected to vehicle height control independently of one another (S100). If the four wheels are simultaneously subjected to vehicle height control (N in S100), the vehicle height at each wheel 14 may be simultaneously increased or decreased. Therefore, the likelihood that the control stop portion 46 will temporarily suspending vehicle height control due to an excessive increase in the internal pressure of a specific one of the absorber units 12 is significantly reduced. Thus, the monitoring of whether the four wheels are simultaneously subjected to vehicle height control is continued in S100. If the respective wheels 14 are subjected to vehicle height control independently of one another (Y in S100), one of the wheels 14 may run on an obstacle 58 or the vehicle 10 may be running on a bumpy road as described above.

If the result in S100 is positive, the ECU 26 acquires the detected pressure in each absorber unit 12 for the respective wheels 14 via the pressure sensor 56 (S102).

The ECU 26 then confirms whether the control stop portion 46 temporarily suspends the vehicle height control (S104). If the control stop portion 46 does not temporarily suspend the vehicle height control (NO in S104), the ECU 26 returns to S100 to continue to monitor whether the four wheels are subjected to vehicle height control independently of one another. On the other hand, if the control stop portion 46 temporarily suspends the vehicle height control in S104 (YES in S104), the operation proceeds to S106.

In S106, to alert the driver that the vehicle height control has been temporarily suspended, the ECU 26 displays a warning on the display unit 34 via the warning processing portion 62.

The ECU 26 then acquires the vehicle speed V of the vehicle 10 via the vehicle speed sensor 54, and confirms whether the vehicle speed exceeds a predetermined threshold (e.g., 30 km/h) (S108). If the vehicle speed exceeds the threshold (YES in S108), the road surface estimation portion 50 estimates that the road surface over which the vehicle travels is smooth. That is, the control recovery portion 48 estimates that the wheel 14 of the vehicle 10 has descended from the obstacle 58 or that the vehicle 10 has left a bumpy road and is traveling over a smooth road surface. In other words, the control recovery portion 48 estimates that the road surface over which the vehicle 10 is traveling satisfies the predetermined condition.

If the vehicle speed exceeds the threshold (YES in S108), the ECU 26 notifies the control stop portion 46 of the cancellation of the temporary suspension of vehicle height control, and cancels the temporary suspension (S110).

The ECU 26 subsequently displays on the display unit 34 via the warning processing portion 62 that the temporary suspension of vehicle height control has been canceled (S112), and returns to S100 to continue monitoring whether the four wheels are subjected to vehicle height control independently of one another.

Then, if the vehicle speed of the vehicle 10 is not above the threshold in S108 (N in S108), namely, when the vehicle speed is equal to or lower than 30 km/h, the operation proceeds to S114.

In S114, the ECU 26 acquires vehicle height values at each wheel 14 via the vehicle height sensor 52, and calculates the warp value with the aid of the warp calculation portion 60 (S114).

The ECU 26 then makes a determination based on the warp value [(S116). If the amount of change in the warp value greatly changes after the vehicle height control is temporarily suspended or if the sign of the warp value is inverted, the road surface estimation portion 50 estimates that the road surface where the vehicle 10 exists is hardly warped (hereinafter "the determination on the warp value is OK") (YES in S116). As a result, the control recovery portion 48 estimates that the wheel 14 has descended from the obstacle 58 or that the vehicle 10 has left a bumpy road and has resumed travel over a smooth road surface.

If the determination on the warp value is OK (YES in S116), the operation proceeds to S110, and the control recovery portion 48 cancels the temporary suspension of vehicle height control (S110) and causes the display unit 34 to indicate that the temporary suspension has been canceled (S112). A return to S100 is then made to continue to monitor whether the four wheels are subjected to vehicle height control independently of one another.

If the determination on the warp value is not OK in S116 (NO in S116), namely, if the warp value does not greatly change after the temporary suspension of the vehicle height control, the ECU 26 determines that it is unlikely that the vehicle 10 has left the bumpy road. The operation then returns to S108 to continue determining whether to cancel the temporary suspension of vehicle height control.

As described above, according to this embodiment of the invention, even if the control stop portion 46 executes the temporary suspension of the vehicle height control due to an increase in the pressure of one of the absorber units 12, it is possible to determine with ease, based on the road surface condition, whether the vehicle 10 is traveling on a smooth road. The suspension of the vehicle height control may be swiftly canceled when the vehicle 10 moves to a position allowing the vehicle 10 resumes traveling on a smooth road. As a result, after the vehicle 10 resumes travel over a smooth road, the vehicle height may be swiftly set to an appropriate vehicle height.

In the flowchart shown in FIG. 4, the ECU 26 first estimates the condition of the road surface from the speed of the vehicle, and estimates the condition of the road surface on the basis of the warp value when the speed of the vehicle is below the threshold speed. However, the ECU 26 may also estimate the condition of the road surface based only on the speed of the vehicle or only the warp value.

Alternatively, instead of estimating the condition of the road surface based on the warp value as described with reference to FIG. 2, the condition of the road surface may be estimated based on information obtained from the acceleration sensor 36, the yaw sensor 38, the navigation system 40, the liquid level sensor 42, and the like. The estimation may be made using each obtained parameter individually or all of the parameters in combination. In the case where all the parameters are sequentially used to estimate the condition of the road surface and if the vehicle 10 is estimated to have moved onto a road surface satisfying the predetermined condition based on one of the information, the temporary suspension of the vehicle height control by the control stop portion 46 may be canceled.

By estimating the condition of the road surface using several different parameters, the reliability of the estimation may be enhanced, and the temporary suspension of the vehicle height control by the control stop portion 46 may be smoothly canceled. As a result, after the vehicle has resumed traveling on a level road, the vehicle height may be swiftly adjusted to an appropriate height.

The configurations shown in the drawings used in this embodiment of the invention is only an example. An effect similar to that of this embodiment of the invention may be obtained, as long as the device is possible to determine, based on the condition of the road surface, whether the vehicle 10 has resumed traveling on a level road when the control stop portion 46 temporarily suspends the vehicle height control due to an increase in the pressure of one of the absorber units 12, and to cancel the suspension of the vehicle height control when it is determined that the vehicle 10 has resumed traveling on a level road, even if the respective configurations are appropriately changed.

In FIG. 2, with a view to making the description understandable, the configuration inside the ECU 26 is illustrated as separate functional units. However, as long as similar functions may be achieved, an effect similar to that of this embodiment of the invention may be obtained even if those functions are integrated or further divided.

While the invention has been described with reference to the example embodiment thereof, it is to be understood that the invention is not limited to the described embodiment or construction. To the contrary, the invention is intended to cover various modifications and equivalent arrangements. In addition, while the various elements of the embodiment are shown in various example combinations and configurations, other combinations and configurations, including more, less or only a single element, are also within the scope of the invention.

What is claimed is:

1. A vehicle height adjustment device comprising:
    a vehicle height adjustment unit, disposed between an axle for supporting respective wheels of a vehicle and a vehicle body, that changes a vehicle height at each wheel of the vehicle through controlling supply and discharge of a fluid;
    a vehicle height sensor that detects the vehicle height at each wheel;
    a vehicle height control unit that executes a vehicle height control, which includes a standard vehicle height control for making the vehicle height at each wheel equal to a predetermined standard vehicle height by controlling the vehicle height adjustment unit;
    a pressure sensor that detects a fluid pressure within the vehicle height adjustment unit;

a control stop unit that temporarily suspends the execution of the vehicle height control by the vehicle height control unit if the detected fluid pressure exceeds a threshold pressure;

a road surface estimation unit that estimates a condition of a road surface over which the vehicle travels; and a control recovery unit that cancels the temporary suspension of the vehicle height control by the control stop unit and allows the vehicle height adjustment unit to change the vehicle height, while the control stop unit temporarily suspends the vehicle height control unit from performing the control, if the road surface estimation unit estimates that the road surface over which the vehicle is traveling satisfies a predetermined condition, wherein the vehicle includes a vehicle height calculation unit that calculates a first sum of vehicle heights at two of the wheels arranged on one diagonal line of the vehicle and a second sum of vehicle heights at two other wheels arranged on another line of the vehicle; and the road surface condition is estimated based on a comparison between the first sum and the second sum.

2. The vehicle height adjustment device according to claim 1, further comprising a vehicle height adjustment switch that is operated by a vehicle operator, wherein the vehicle height adjustment unit is manually initiated by operation of the switch.

3. The vehicle height adjustment device according to claim 1, wherein:

the vehicle includes a vehicle speed sensor that detects the vehicle speed; and the road surface condition is estimated based on a comparison between the detected speed of the vehicle and a predetermined reference vehicle speed.

4. The vehicle height adjustment device according to claim 3, wherein the road surface estimation unit estimates that the road surface over which the vehicle is traveling satisfies the predetermined condition if the vehicle speed is higher than the predetermined reference vehicle speed.

5. The vehicle height adjustment device according to claim 3, wherein the road surface estimation unit estimates that the road surface over which the vehicle is traveling fails to satisfy the predetermined condition if the vehicle speed is below the predetermined reference vehicle speed.

6. The vehicle height adjustment device according to claim 1, wherein the road surface estimation unit estimates that the road surface over which the vehicle is traveling satisfies the predetermined condition if the difference between the first sum and the second sum is smaller than a predetermined value.

7. The vehicle height adjustment device according to claim 1, wherein the road surface estimation unit estimates that the road surface over which the vehicle is traveling satisfies the predetermined condition if an absolute value of the difference between, the first sum and the second sum at a time the temporary suspension by the control stop unit is executed and the difference between the first sum and the second sum after the temporary suspension by the control stop unit is executed, exceeds a predetermined value.

8. The vehicle height adjustment device according to claim 1, wherein the road surface estimation unit compares, the difference between the first sum and the second sum at a time the temporary suspension by the control stop unit is executed and the difference between the first sum and the second sum after the temporary suspension by the control stop unit is executed, and estimates that the road surface over which the vehicle is traveling satisfies the predetermined condition if the signs of the differences, each of which is either positive or negative, are interchanged.

9. The vehicle height adjustment device according to claim 1, wherein:

the vehicle includes a vehicle attitude calculating unit that calculates an attitude of the vehicle; and the road surface condition is estimated based on a comparison between a reference horizontal attitude, which is established when the vehicle is traveling over a substantially horizontal road surface, and the calculated attitude of the vehicle.

10. The vehicle height adjustment device according to claim 9, wherein:

the vehicle attitude calculating unit calculates an absolute attitude of the vehicle based on at least one of a vehicle acceleration and a vehicle yaw amount; and the road surface estimation unit compares the calculated attitude of the vehicle with the reference horizontal attitude, and estimates that the road surface over which the vehicle is traveling satisfies the predetermined condition if the attitude of the vehicle is more horizontal than the reference horizontal attitude.

11. The vehicle height adjustment device according to claim 1, wherein:

the vehicle includes a liquid level inclination measuring unit for measuring a liquid level inclination of a liquid provided in the vehicle; and the condition of the road surface is estimated based on the measured liquid level inclination.

12. The vehicle height adjustment device according to claim 11, wherein the road surface estimation unit estimates that the road surface over which the vehicle is traveling satisfies the predetermined condition if the measured liquid level inclination is equal to or lower than a predetermined liquid inclination level.

13. The vehicle height adjustment device according to claim 1, wherein:

the vehicle includes a vehicle position acquisition unit for acquiring a position of the vehicle from a map that identifies road locations; and the condition of the road surface is estimated based on a deviation of the vehicle position from a road, which is determined based on a comparison between the acquired position of the vehicle and the road locations identified in the map.

14. The vehicle height adjustment device according to claim 13, wherein the road surface estimation unit estimates that the road surface over which the vehicle is traveling satisfies the predetermined condition if it is determined that the acquired position of the vehicle is within a predetermined distance from the location of a road identified in the map.

* * * * *